Dec. 26, 1950 K. S. JOHNSON 2,535,681

ELECTROACOUSTIC SYSTEM AND MEANS

Original Filed Aug. 7, 1946 5 Sheets-Sheet 1

INVENTOR
K. S. JOHNSON
BY Robert J. Pluskey
ATTORNEY

ELECTROACOUSTIC SYSTEM AND MEANS

Original Filed Aug. 7, 1946

INVENTOR
K. S. JOHNSON
BY
Robert J. Fluskey
ATTORNEY

INVENTOR
K. S. JOHNSON
BY Robert J. Fluskey
ATTORNEY

ELECTROACOUSTIC SYSTEM AND MEANS

Original Filed Aug. 7, 1946 5 Sheets-Sheet 4

INVENTOR
K. S. JOHNSON
BY
Robert J. Fluskey
ATTORNEY

ELECTROACOUSTIC SYSTEM AND MEANS

Original Filed Aug. 7, 1946 5 Sheets-Sheet 5

INVENTOR
K. S. JOHNSON
BY
Robert J. Fluskey
ATTORNEY

Patented Dec. 26, 1950 2,535,681

UNITED STATES PATENT OFFICE 2,535,681

ELECTROACOUSTIC SYSTEM AND MEANS

Kenneth S. Johnson, South Orange, N. J., assignor to Bell Telephone Laboratories, Incorporated, New York, N. Y., a corporation of New York Original application August 7, 1946, Serial No. 688,906. Divided and this application May 6, 1949, Serial No. 91,762

7 Claims. (Cl. 179—1)

This is a division of application Serial No. 688,906, filed August 7, 1946, now Patent No. 2,516,776, issued July 25, 1950, for Electroacoustic System and Means.

This invention relates to electroacoustic transducer systems, and, more particularly, to conference or distant-talking systems, public address systems and telephone station circuit arrangements.

In communication systems or circuits employing electroacoustic transducers, for example, sound wave reproducers or loudspeakers, and transmitting devices or microphones, and particularly in public address systems, and conference or two-way distant talking loudspeaking systems, amplification in the electrical portion of the system is generally desirable and frequently may be essential. If this amplification is not to result in undesirable echo or reverberant effects, the acoustic output from the reproducer or loudspeaker either should or must cause a negligible effect only at the input of the transmitting device or microphone, that is, over the frequency range to be amplified; or, in the case of a two-way loudspeaking system, similar effects should be caused or produced at both ends of the circuit.

An object of this invention is to make available conference or distant-talking loudspeaker systems and devices.

Another object is to simplify telephone station circuits of the anti-sidetone type by obviating any need for induction-type transformers therein.

Still another object is to provide improved public address systems and devices.

A feature of the invention is the use of a single electroacoustic transducer both as a sound wave pick-up device or microphone and as a sound wave reproducing device or loudspeaker, and associating a substantially identical transducer and appropriate network therewith, to control the acoustic dissymmetry of the room, auditorium or other space in which the public address or sound wave amplifying system is to be used.

Another feature comprises enclosing the sound wave pickup device or microphone, and the amplifying sound wave reproducer or loudspeaker comprising the public address or sound wave amplifying system, in a symmetrical acoustic chamber or bridge, having at least a pair of acoustic openings, one opening connecting the chamber with the room, auditorium or other space in which the user or speaker is located, and the other opening leading into or connecting the chamber with an appropriate balancing impedance.

Still another feature comprises the employment of such an enclosing arrangement, in which the balancing impedance is obtained by an actual physical or a simulated duplicate of the space in which the speaker or user of the system is located.

A further feature of the invention comprises employing a balancing network type of repeater circuit including two or more electroacoustic transducers, one or more being located in the space or room containing the user of the arrangement, and one or more being located in a second balancing or dummy room or acoustic chamber.

An additional feature comprises a public address or distant-talking loudspeaking system, in which acoustic coupling may exist between the sound wave pickup device and the reproducing device without causing undesirable singing.

Still another feature involves doubly conjugate electroacoustic transducer systems obviating the need for any inductive transformer in an anti-sidetone telephone station circuit or of the so-called hybrid coil or transformer type in telephone repeater circuits.

Other objects and features of the invention will become evident from the detailed and general descriptions that follow hereinafter.

A more complete understanding of the invention will be derived from the detailed description that follows, taken in conjunction with the appended drawings, wherein.

Figure 19:
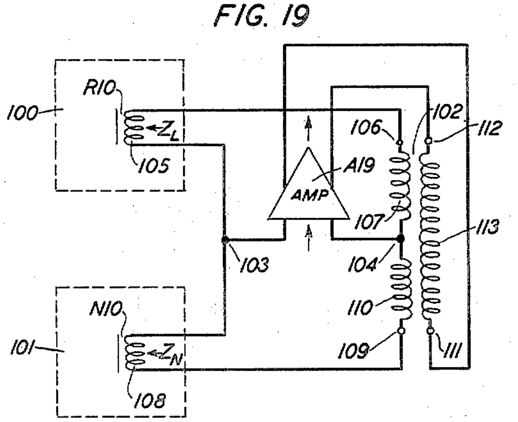
Fig. 19 shows a public address system including a plurality of balanced electroacoustic structures and an amplifying means for the system, in accordance with this invention.
Figure 20:
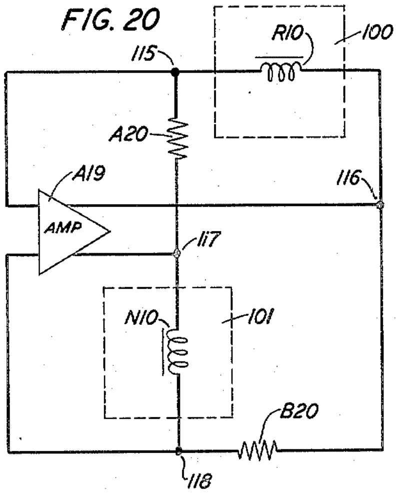
Fig. 20 shows a modification of the arrangement of Fig. 19, in which a pair of two-terminal impedance elements replaces the hybrid coil included in the arrangement of Fig. 19.
Figure 21:
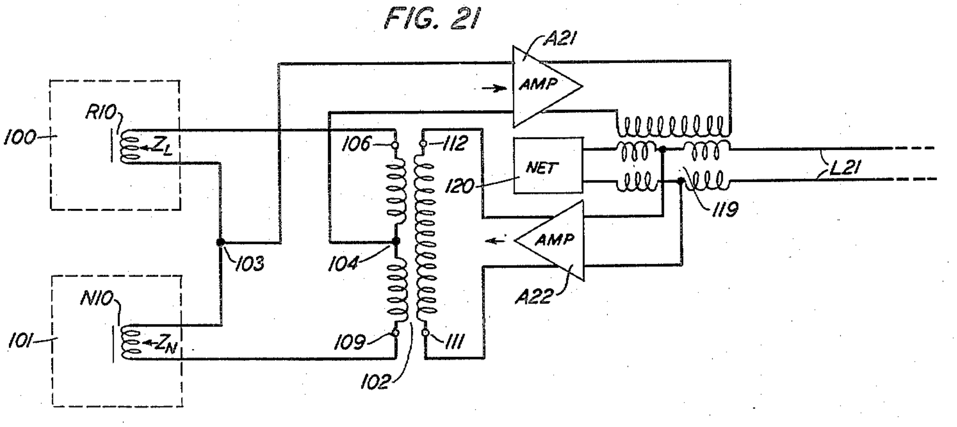
Fig. 21 and Fig. 22 illustrate the terminal circuit arrangements for two-way, distant-talking conference or loudspeaker systems embodying the principles of the arrangements of Fig. 19 and Fig. 20, respectively.
Figure 22:
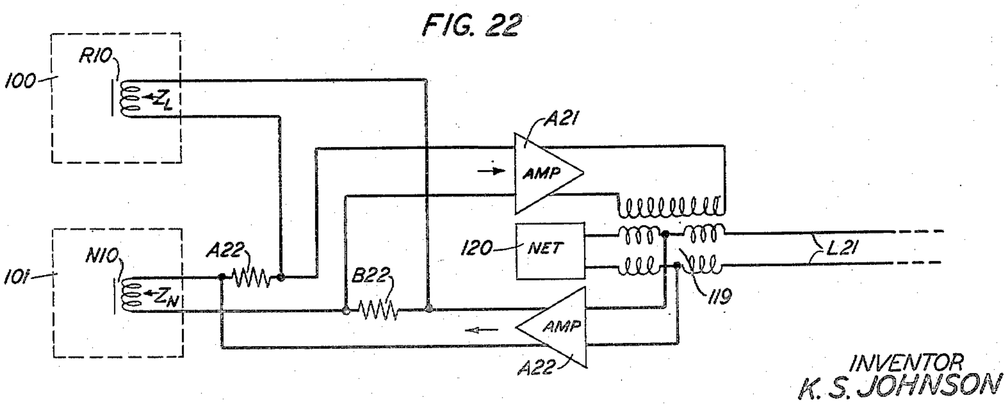
Figure 23:
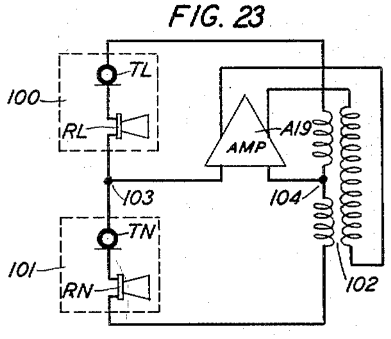
Figure 24:
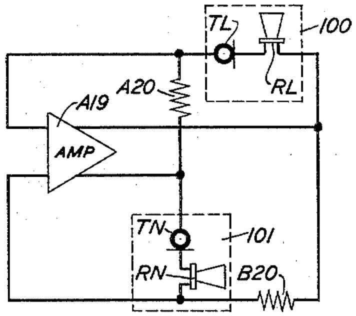
Figure 25:
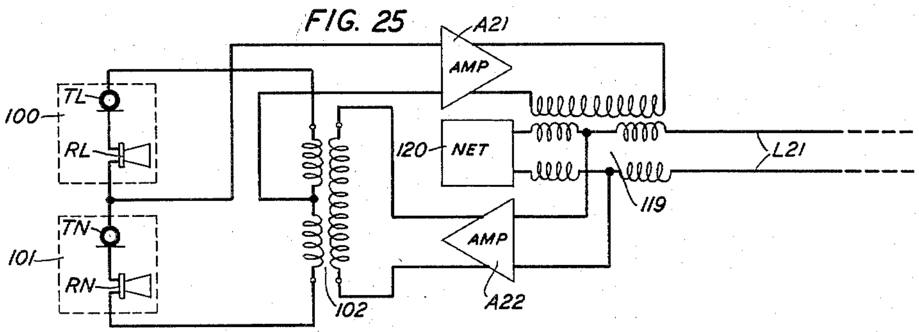
Figure 26:
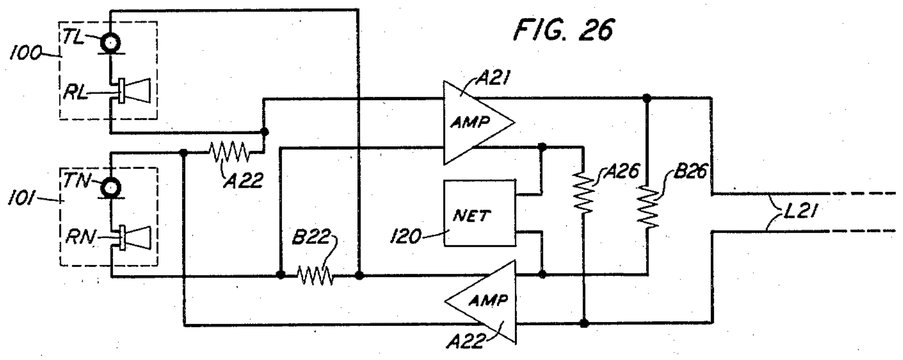
Figure 27:
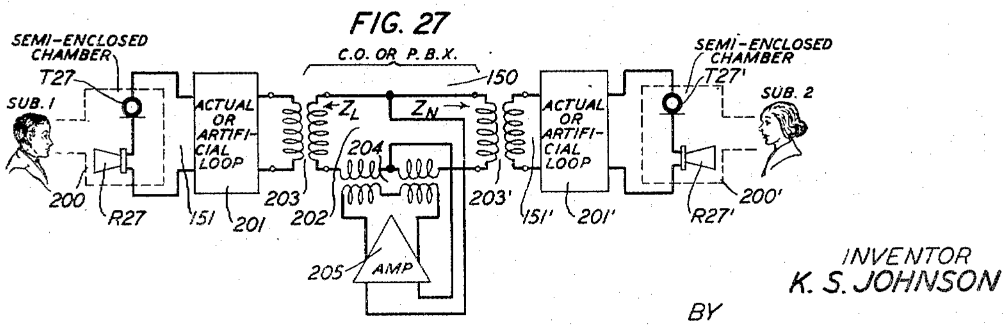

Figs. 23, 24, and 25 illustrate electroacoustic systems otherwise identical with the arrangements of Figs. 19, 20 and 21, respectively, except that series-connected pickup device or microphone and receiver or loudspeaker replace the single electroacoustic transducers of Figs. 19, 20 and 21;

Fig. 26 illustrates an electroacoustic system similar to that of Fig. 22 except that series-connected pickup device or microphone and receiver or loudspeaker replace the single electroacoustic transducers of Fig. 22, and the hybrid coil of Fig. 22 is a replaced by a plurality of two-terminal impedance elements in accordance with the principles of this invention; and Fig. 27 illustrates a further modification of the invention as applied to a telephone transmission system.

Communicating systems of the public address, conference or distant-talking loud speaking types have received considerable study heretofore from the standpoint of minimizing, or otherwise controlling, acoustical and electrical feedback therein that would otherwise introduce undesired, or undesirable, singing, echo or reverberant effects in the system. One such system is disclosed in R. J. Tillman United States Patent No. 2,269,565, January 13, 1942, entitled "Communication System," the circuit arrangement of which is illustrated in simplified schematic by Fig. 1 herein. It is essentially an anti-sidetone station circuit in which there are amplifying means and loss networks. A microphone M, amplifying device or means A1, and a variable loss network NW1 are included in the transmitting branch, and coupled to a transmission line L through an equalizer network NW3 and a hybrid or anti-sidetone induction coil and balancing network 10. A pair of loud speakers R1, R2 amplifying device or means A2, and a variable loss network NW2 are included in the receiving branch, and are coupled to the transmission line L through the aforesaid equalizer network and hybrid coil and balancing network. Switching means SW (including hangover relays, rectifying elements and other components) is provided to vary the loss and the gain between the microphone and the loud speakers and the hybrid coil. Fig. 2 shows an electrical circuit analogous of the arrangement of Fig. 1, the corresponding elements bearing corresponding reference designations, the network N being the analog of the circuit components matching or balancing the impedance of the transmission line.

A feature of the Tillman arrangement appears to consist either of shaping the switched loss, or of attempting to make the acoustical path between the loud speakers and the microphone effectively a conjugate one, that is, to make infinite, or as large as possible, the acoustical transfer impedances between the electrical receiving or acuostical transmitting path and the electrical transmitting or the acuostical receiving path. This acoustical impedance is to be large, especially at those frequencies at which the electrical portion of the system has a large amount of gain, so that the overall electrical and acoustical system will have a loss in it at all frequencies, and, therefore, the system will not embody undesired feedback or "singing." With reference to Fig. 1 herein, this would mean that any electrical currents entering the receiving branch or the loud speakers R1, R2, shall not be responsible for producing sufficient electromotive force in the transmitting branch, as a result of a finite acoustical transfer impedance between the receiving and the transmitting elements in the system, to cause the system to sing.

Figure 3:
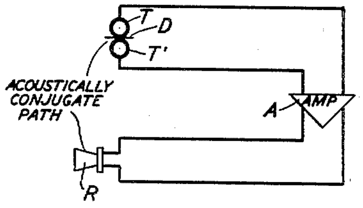
Fig. 3 shows, in block diagram form, a public address system which will be referred to in discussing features of the present invention.
Figure 4:
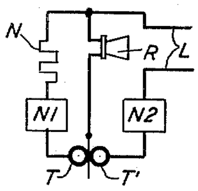
Figs. 4 and 5 show electrical circuit analogs of the arrangement shown in Fig. 3.
Figure 5:
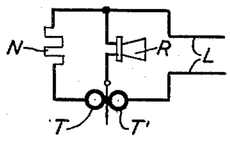

In the recently issued United States Patent No. 2,348,629, May 9, 1944, entitled "Public Address System" of the present inventor, there is shown means for obtaining good acoustical balance, together with high efficiency of coupling between the mouth of the user of a public address system and the microphone of the latter, as well as between the loud speaker of the system and the user's ears. Fig. 3 herein, corresponding to Fig. 2 of Patent No. 2,348,629, is a simplified schematic of the system of this Johnson patent. Fig. 3 illustrates a public address system including a single diaphragm (D), double converting element (T, T') microphone, a loudspeaking telephone receiver R, and an electrical amplifying means A interconnecting the microphone and receiver. In the arrangement of Fig. 3, the acoustically conjugate path was proposed to be obtained by the use of effectively two sound wave pick-up devices or microphones (actually one pick-up device), and one telephone receiving or reproducing device, combined with acoustic networks in such a way as to offset the effects of acoustic dissymmetry in the room, auditorium or other space in which the public address system was to be used. The anti-sidetone circuit arrangement of Fig. 4 is an electrical analog of the Johnson patent arrangement. In the arrangement of Fig. 4, the components N1, N2 are balanced against the components N and L (representing a transmission line), where the components N1 and N2 represent the electrical equivalents of the acoustical elements of the public address system, and the components L and N are the electrical equivalents of the acoustic paths between the receiver R and the microphone. Essentially, the arrangement of Fig. 4 is an anti-sidetone circuit of the type shown in Fig. 5 in which a single network or component N balances the impedance of a transmission line L.

In the Tillman patent arrangement, the conjugate path is obtained by the use of two receiving elements and one transmitter element or microphone. No means appears to be included in the Tillman arrangement for compensating for differences in the acoustical transfer impedances between the microphone and the two receiving elements or devices.

Figure 6:
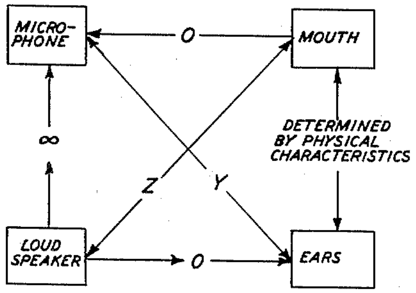
Fig. 6 shows a block diagram included for purposes of discussion of the factors involved in electroacoustic systems of the type to which the present invention relates.

Considering this acoustic problem from a fundamental standpoint, it is to be noted that there are four primary elements, exclusive of variable room conditions, involved in the acoustical system, namely, the microphone or pick-up device, the loudspeaker or reproducing device, the talker's mouth and his ears. These elements are shown in Fig. 6 in correspondingly labeled blocks. In order to prevent "singing," the desired acoustical transfer impedance between the loudspeaker and the microphone should approach infinity, as indicated by the conventional symbol between the corresponding blocks in Fig. 6. On the other hand, for maximum overall efficiency, the acoustical transfer impedances between the loudspeaker and the ear, as well as between the mouth and the microphone, should approach zero as indicated by the symbols in Fig. 6. The acoustical transfer impedance between the mouth and the ear of an individual is presumably not under much control, and approaches a relatively low value. The values of the acoustical transfer impedance, Z, between the mouth and the loudspeaker, and that, Y, between the microphone and the ears, are not directly of important consequence. The primary problem is to consider what would be the best possible physical arrangement so that the acoustical transfer impedance between the loudspeaker and the microphone will be as near infinity as possible at all frequencies transmitted efficiently by the electrical system, and at the same time to make the acoustical transfer impedance between the mouth and the microphone, as well as between the loudspeaker and the ears, approach zero as nearly as possible.

Figure 1:
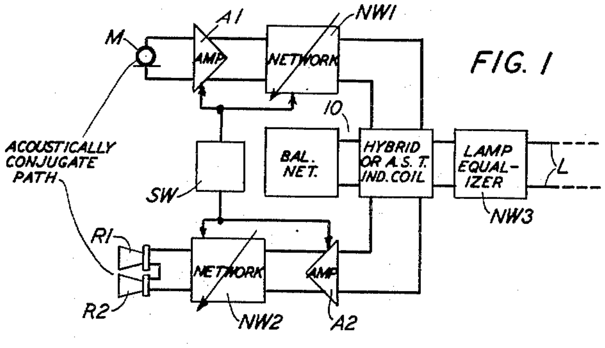
Fig. 1 shows, in block diagram form, one station of a two-way, distant-talking loudspeaker or conference system which will be referred to for discussing features of the present invention.
Figure 2:
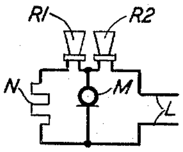
Fig. 2 is the electrical circuit analog of the arrangement of Fig. 1.

If in the arrangement of Fig. 1 herein, the loudspeakers R1, R2 could be placed in a room, or other space, in such a way that the acoustical impedances between each of them and the microphone were identical, this would be the equivalent of having the components N, L, of the electrical analog shown in Fig. 2 equal, in which case the microphone and the loudspeaker branches would be conjugate. A similar situation would hold true in the arrangements of Figs. 3 and 5 if the microphone elements could be acoustically balanced with respect to the receiver. As already pointed out, however, this balance must be obtained without unnecessary sacrifice in the acoustical efficiency between the mouth and the microphone, and between the loudspeaker and the ear.

Figure 7:
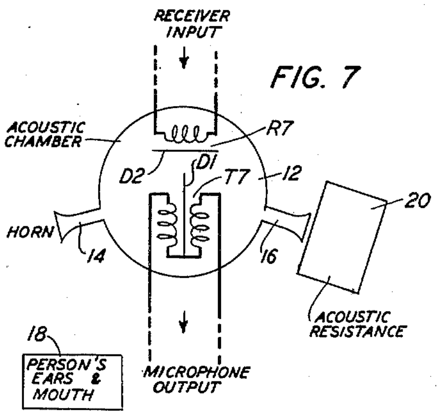
Fig. 7 illustrates an electroacoustic system, for example, a public address system or structure, in accordance with the invention.

To provide a clearer understanding of this, reference is made to the showing of Fig. 7. Fig. 7 shows a hollow acoustic chamber 12 of substantially symmetrical configuration, for example, spherical or cylindrical, in which are positioned a sound wave energy pick-up device or microphone T7, and a sound wave energy reproducing device or loudspeaker R7, the chamber being provided with a pair of acoustic paths or openings 14, 16. One path 14 provides an acoustic coupling between the interior of the chamber and the room, auditorium, or other space, in which the user is located, as indicated by the block designated 18. The other path 16 couples the interior of the chamber with an acoustic structure or network 20, simulating the acoustical characteristics of the room or auditorium. The sound wave translating members or diaphragms D1, D2 of the microphone and loudspeaker are arranged substantially at right angles, or conjugate to one another. In effect, these translating members will be acoustically conjugate to each other, provided that there is equality between the two acoustical impedances looking into the acoustical paths 14 and 16.

Figure 8:
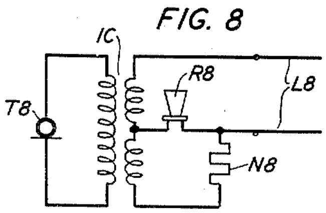
Fig. 8 shows an electrical circuit analog to be discussed with reference to the arrangement of Fig. 7.

The arrangement of Fig. 7 might be considered at a first approximation, as the acoustical equivalent of the anti-sidetone station circuit arrangement shown in Fig. 8, in which a microphone or transmitter T8, a receiver R8, a transmission line L8, a line balancing network N8, and a multi-winding induction coil IC are included. The receiver R8 and the transmitter T8 will be conjugate, that is, in anti-sidetone relation, provided that the impedance of the network N8 is appropriately proportioned with relation to that of the impedance looking into the line L8. This line impedance corresponds to the acoustical impedance looking into the acoustic path 14, and that of the network N8 corresponds to the acoustical impedance looking into the acoustical path 16.

From this latter described analog, it will be seen that the most efficient way in which the loudspeaker and the microphone of the acoustic system can be made conjugate is, first to have the microphone and the loudspeaker inherently balanced with respect to each other in an enclosed chamber from which there are a pair of acoustic paths or openings, one leading to the room or auditorium in which the user of the arrangement is located, and the other of which simulates the impedance of the first path so that acoustic balance is obtained in the same way as the corresponding electrical balance is obtained in anti-sidetone circuits. If the acoustical impedances are known, for the frequencies over which the system is to function, the acoustical design is comparatively simple because of this electrical analog. As already indicated, however, this analog is not complete since, in the arrangement of Fig. 8, an induction coil is included, whereas, in the arrangement of Fig. 7, there are no acoustical elements having mutual impedance. There will now be described a number of doubly conjugate circuits and systems of the public address, conference and telephone station types, in which elements or components having substantially no mutual impedance between them are employed.

Four of such general type of anti-sidetone telephone station circuits are shown in Figs. 9 to 16, inclusive. In each of these circuits, six circuit elements or components are employed, namely, a transmission or telephone line L; a sound wave energy pick-up device, that is, a two-terminal microphone or transmitter T; a sound wave energy reproducing device, that is, a two-terminal telephone receiver or loudspeaker R; a two-terminal network N for balancing the impedance of the line; and a pair of auxiliary, two-terminal impedance elements A, B having substantially no mutual impedance between them. In Figs. 9 to 12, inclusive, the impedance elements are designated by the symbols A, B and may be resistive, inductive or capacitive impedances. Line terminals for the circuits are designated by the symbols 5, 5. In the circuits of Figs. 9 to 16, inclusive, there is no common terminal between the transmission line and the balancing network, or between the receiver and the microphone.

Figs. 9 to 12 represent general embodiments of this concept of a transformerless anti-sidetone station circuit. In each circuit, it will be noted that the balancing network and the impedance elements are connected in series across the line terminals, the microphone is connected in series with one impedance element across the line terminals, and the receiver is connected in series with a second impedance element across the line terminals.

Figure 9:
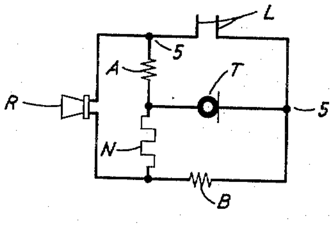
Figs. 9, 10, 11 and 12 illustrate anti-sidetone telephone station circuits embodying a plurality of two-terminal impedance elements, in accordance with this invention, to obviate use of either induction coils or hybrid coils in circuits of this type.
Figure 10:
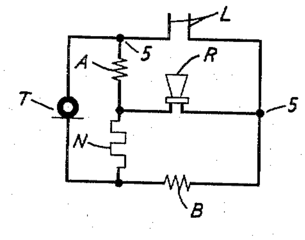
Figure 14:
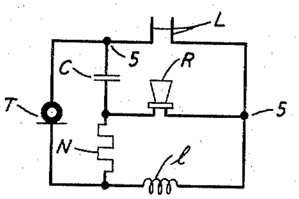
Figure 11:
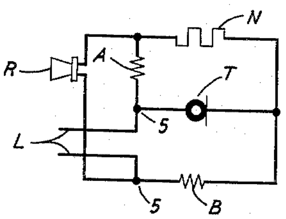
Figure 15:
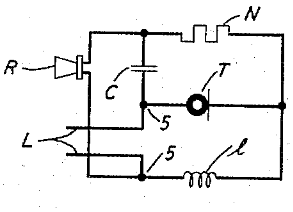
Figure 12:
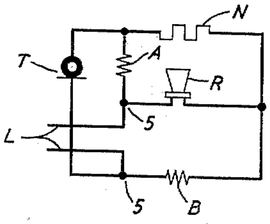

In Fig. 9, the microphone T is connected in series with impedance element A, and the receiver R is connected in series with impedance elements B across line terminals 5, 5. In Fig. 10, the receiver R is connected in series with impedance element A, and the microphone T is connected in series with the impedance element B across the line terminals 5, 5. In Fig. 11, the microphone T is connected in series with the impedance element B, and the receiver R is connected in series with the impedance element A across the line terminals 5, 5. In Fig. 12, the receiver R is connected in series with the impedance element B, and the microphone T is connected in series with the impedance element A across the line terminals 5, 5. In each of Figs. 9 to 12, the network N and impedance elements A, B are connected in series across the line terminals 5, 5.

As already noted, the impedance elements A, B may be resistive, inductive or capacitive impedances. The circuit of Fig. 13 corresponds to that of Fig. 9, with an inductance coil $l$ representing impedance element A and capacitor C providing the capacitance representing impedance element B of Fig. 9; and the circuit of Fig. 14 corresponds to that of Fig. 10, with capacitor C providing a capacitance representing the impedance element A, and the inductance coil $l$ representing impedance element B. The circuit of Fig. 15 corresponds to that of Fig. 11, with the capacitor C providing the capacitance representing impedance element A, and inductance coil $l$ representing impedance element B; and the circuit of Fig. 16 corresponds to that of Fig. 12, with the inductance coil $l$ representing impedance element A, and the capacitor C providing a capacitance representing impedance element B. In general, for receiver-transmitter conjugacy $$Z_A Z_B = Z_L Z_N = Z_R Z_T$$

where $Z_A$, $Z_B$ etc. are the impedances of A, B, etc.

Figure 13:
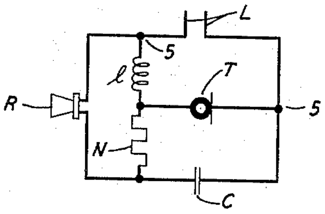
Figs. 13, 14, 15 and 16 illustrate circuits corresponding to those of Figs. 9, 10, 11 and 12, but in which the impedance elements are shown specifically either as inductive impedances or capacitive impedances.

A clearer understanding of the principles involved in the circuit arrangements of Figs. 9 to 16 will be derived from a consideration of the impedance relationships that should exist in a typical one of these circuits, for example, as represented in Figs. 9 and 13.

With an electromotive force acting in the microphone T of Fig. 9 or Fig. 13, i. e., when a user of the circuit is transmitting out of the station circuit, there will be no current in the receiver R, i. e., no sidetone, provided $$\frac{Z_A}{Z_N} = \frac{Z_L}{Z_B}$$

or (1)

$$\frac{Z_l}{Z_N} = \frac{Z_L}{Z_C}$$

where: the symbol Z, with the appropriate subscript, represents the impedance of the element or component in the circuit identified by the specific subscript A, B, L, N, $l$ and C.

For the condition of an electromotive force acting from the line across the line terminals 5, 5, that is, during receiving or listening at the station circuit, there will be no current in the balancing network N, provided $$\frac{Z_A}{Z_T} = \frac{Z_R}{Z_B}$$

or (2)

$$\frac{Z_l}{Z_T} = \frac{Z_R}{Z_C}$$

When Equation 2 is satisfied, the circuits of Figs. 9 and 13 reduce in effect, on receiving, to ones in which series circuits of the microphone and one impedance element (or an inductive reactance) and of the receiver and the other impedance element (or a capacitive reactance), are connected in parallel across the line terminals.

If the receiver and the microphone are equal resistances, or are designed to present equal resistances in the circuit or if their product is constant, and $$\frac{Z_l}{Z_C} = Z_R Z_T \quad (3)$$

the impedance of the station circuit will be a constant pure resistance, that of the receiver or of the microphone, at all frequencies. The energy ratio, Y, that is, during receiving, the ratio of the energy delivered to the transmitter to that delivered to the receiver, is a function of the frequency as well as of the product of $Z_l$ and $Z_C$, the function being an inverse one if the element $l$ and the element C are interchanged in position.

Figure 17:
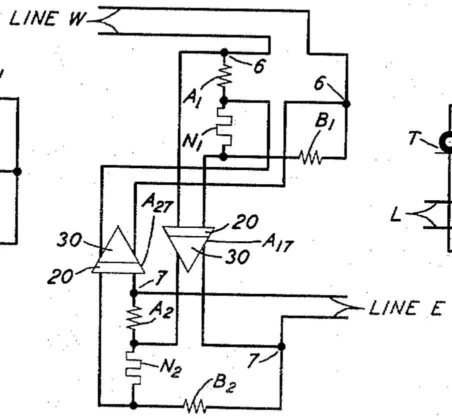
Fig. 17 illustrates a two-way repeater type transmission system in accordance with the invention.
Figure 16:
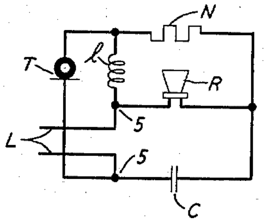

Anti-sidetone circuits of the general type illustrated in Figs. 9 to 16, inclusive, may be embodied in two-way, one repeater (amplifier); two-way, two repeater (amplifier); and four-wire repeater (amplifier) telephone circuits, to obviate the need for hybrid-type transformers or coils in such repeatered circuits. By way of specific example, Fig. 17 illustrates a two-way, two-repeater telephone circuit embodying a circuit of the type illustrated in Fig. 9. In Fig. 17, a line balancing network $N_1$, and impedance elements $A_1$, $B_1$ are connected in series across the line terminals 6, 6 for the two-way voice frequency telephone line W, and a line balancing network N2 and impedance elements $A_2$, $B_2$ are connected in series across the line terminals 7, 7 for a second two-way voice frequency telephone line E; the input terminals of a voice frequency repeater or amplifying device $A_{17}$ being connected across the series connection of network $N_1$ and impedance element $A_1$, and its output terminals being connected across the series connection of network $N_2$ and impedance element $B_2$; and the input terminals of a second voice frequency repeater or amplifying device $A_{27}$ being connected across the series connection of network $N_2$ and impedance element $A_2$, and its output terminals being connected across the series connection of network $N_1$ and impedance element $B_1$. If amplifiers of the so-called mechanical type, that is, of the type including an acoustically coupled telephone receiver element 20 and a telephone microphone element 30 are used for the repeaters $A_{17}$, $A_{27}$, the cost of such a repeater circuit could be kept to a minimum. In this connection, it may be noted from the conjugacy relations, as indicated by Equations 1 and 2, that the balancing network is not, in general, equal to the line impedance unless the latter is a substantially pure resistance, but the balancing network and the line must be inverse networks of constant resistance products. This fact, however, does not in general complicate the design or use of the described type of repeater circuit.

Figure 18:
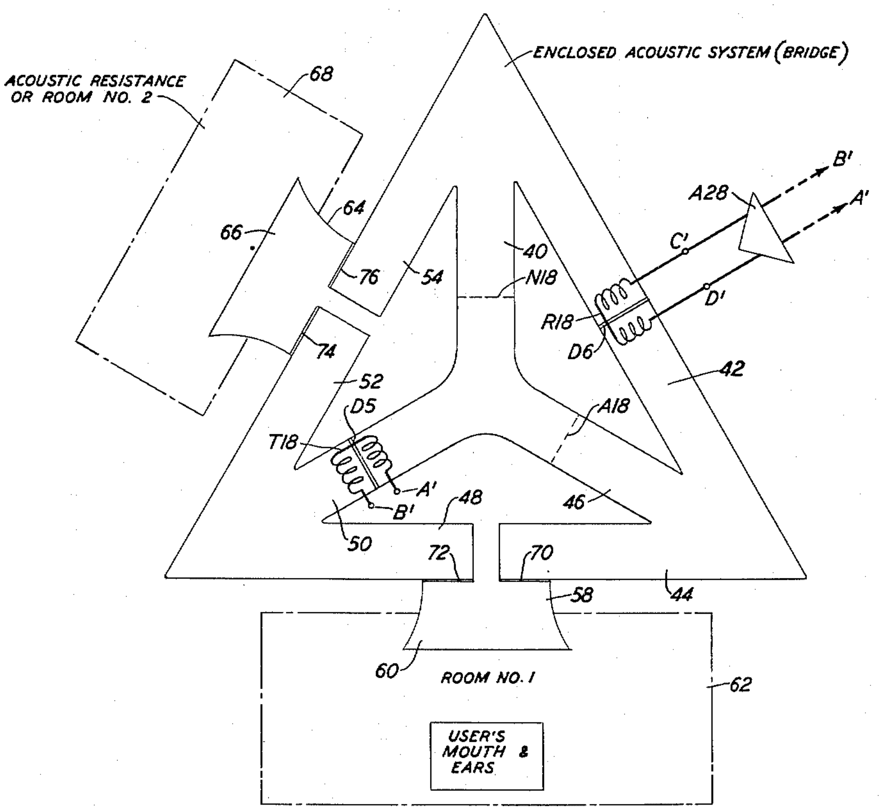
Fig. 18 illustrates a closed acoustic system or bridge, specifically, a public address system or one station of a two-way distant-talking loudspeaker system, in accordance with the invention.

The acoustical equivalent of an anti-sidetone circuit such as is illustrated, for example, by Fig. 9 is shown in Fig. 18. Fig. 18 illustrates an enclosed acoustic structure or system, or acoustic bridge, comprising a plurality of tubular members 40, 42—54 of substantially uniform cross-sectional dimension; a sound wave energy pick-up device or microphone T18, having its sound wave translating member or diaphragm D5 extending across one tubular member, for example, member 50, and exposed on each surface for access of sound wave enegy thereto; a sound wave energy reproducing device or loudspeaker R18, having its sound wave translating member or diaphragm D6 extending across a second of the tubular members, for example, member 42, and exposed on each surface thereof for radiation of sound wave energy therefrom; acoustic impedance elements A18, N18 positioned in a pair of the tubular members, for example, member 46 and member 40, respectively, and extending across the passages in such members; a member or horn 58 defining an acoustic path or opening 60, connecting the acoustic bridge with the room, auditorium or other space, shown by the broken-line block designated 62 in which the user of the system is located; and a member or horn 64, defining a second acoustic path or opening 66, connecting the acoustic bridge with a second room or space shown by the broken-line block designated 68, or leading into an acoustic impedance network simulating or duplicating the acoustic characteristics of the space 62. The coupling between the member 58 and the tubular members 44, 48 may be diaphragms 70, 72 in the walls of the tubular members, and the coupling between the members 64 and the tubular members 52, 54 may be diaphragms 74, 76 in the walls of the latter mentioned tubular members. The impedance element A18 and the network N18 may be acoustic resistances of the type described in the P. B. Flanders article "Acoustic Attenuators," Bell Laboratories Record, August, 1938, page 403, et seq. The enclosed acoustic structure is symmetrical in configuration with the microphone T18 and receiver R18 in symmetrical relation, and with impedance element A18 and network N18 equidistant from the microphone T18 and from the receiver R18. The members 58, 64 are symmetrically disposed with reference to the microphone T18 and the loudspeaker R18. The characteristic acoustic impedance of the tubular members is preferably equal to that of the diaphragms and of the acoustic impedance elements in the tubular members. The acoustic attenuation of the tubular members themselves may be negligibly small. The path or opening to the room containing the user of the system corresponds to the line L, the acoustic resistances A18, N18 correspond to the impedance element A and the network N, the microphone T18 and receiver R18 correspond to the microphone T and the receiver R, respectively, and the opening or path to the room or acoustic impedance 68 and the latter correspond to the impedance element B, of Fig. 9. The terminals A′, B′ of the microphone T18 and the terminals C′, D′ of the loudspeaker R18 are interconnected through a voice frequency amplifying means or device A28. If the user of the arrangement described with reference to Fig. 18, is, as noted, located in the region designated 62, and the region designated 68 is a reasonably good acoustic or other simulation of the region 62, the acoustic system is obviously, by symmetry, balanced, and the loudspeaker R18 and the microphone T18 will be acoustically conjugate, thereby theoretically permitting any desired amount of gain in the electrical portion of the arrangement between the terminals A′—B′ and C′—D′. The arrangement of Fig. 18, obviously, may be included in a public address system, or in one terminal of a conference system or a two-way distant-talking loudspeaking telephone system.

Figure 18A:
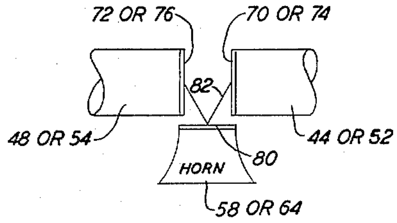
Fig. 18A shows a modification of a portion of the structure of Fig. 18.

Fig. 18A illustrates an alternative arrangement for coupling regions 62, 68 to the acoustic bridge. The openings in the ends of the members 58 or 64, may be closed by a diaphragm 80 mechanically linked to the diaphragms 70, 72 or 74, 76 by appropriate linkage 82, the latter diaphragms being disposed across the adjacent end portions of tubular members 44, 48 or 52, 54.

A somewhat similar system to that of Fig. 18 in that it depends upon the use of two balanced acoustical rooms, areas or spaces, or one such room, auditorium or the like and a balancing electroacoustic impedance, is shown in the arrangements illustrated by Figs. 19 to 22, inclusive, of the drawings. Fig. 19, for example, shows an electroacoustic transducer R10 positioned in a room, auditorium or other space 100 in which the system of Fig. 19 might be used, and a second electroacoustic transducer N10, which may be a substantial duplicate of the transducer R10, located or positioned in a second room 101, which may be a substantial duplicate of the room 100, or may be an acoustical simulation thereof. The transducers R10, N10 are interconnected through a three-winding transformer or hybrid coil 102 and a voice frequency amplifying means or device A19. The voice currents winding 105 of the transducer R10 is connected to one input terminal 103 of amplifier A19 and to one terminal 106 of winding 107 of the transformer. The voice currents winding 108 of the transducer N10 is connected to the terminal 103 and to one terminal 109 of the winding 110 of the transformer. The other input terminal 104 of the amplifying means A19 is common to the inner ends of the windings 107, 110. The output terminals of the amplifier A19 are connected to terminals 111 and 112 of the third transformer winding 113. The transducers R10, N10 may be of the so-called dynamic or moving coil type of loudspeaker, with the transducer R10 being used both as the sound wave energy pick-up device or microphone and as the sound wave reproducing device or loudspeaker for the public address system. The electrical circuit arrangement bears a similarity to the so-called 21-type repeater circuit used in the telephone art, with the electroacoustical means represented by the room 101 and transducer N10 corresponding to the balancing network and transformer 102 corresponding to the so-called hybrid coil. In the operation of the system, sound wave energy impressed on the transducer R10 will cause voice frequency currents to be generated in the coil 105 which will traverse the winding 107 and will be impressed across the input terminals of the amplifying means A19. The latter voice frequency currents are amplified by the device A19 and impressed across the winding 113. The amplified voice currents in winding 113 will be induced in windings 107, 110, and, if their number of turns and polarity have been appropriately chosen, the division of such induced currents between the transducer R10 and the transducer N10 will be such that their effect at the input terminals 103, 104 of the amplifier will be balanced out, with the currents induced in winding 107 effective on the transducer R10 to cause the latter to reproduce the amplified voice currents as amplified sound wave energy directed into the room or auditorium 100. As already indicated, the impedances $Z_L$ and $Z_N$ looking into the electrical sides of the transducers R10, N10, are such that only a negligible amount of the electrical output of the device A19 will be impressed across the input of such device. In this fashion, any tendency toward singing or undesirable feedback is minimized.

Fig. 20 shows a public address system similar to that of Fig. 19 except that the transformer has been replaced by a pair of impedance elements A20, B20 in accordance with the principles discussed hereinabove with reference to Figs. 9 to 16, inclusive. The voice currents coil of the transducer R10 is connected to one terminal 115 of impedance element A20, which may also be one of the input terminals of amplifying device A19, and to one output terminal 116 of the device A19. The voice currents coil of the transducer N10 is connected to the second output terminal 117, of the device A19, which may also be the second terminal for the impedance element A20, and also to the second input terminal 118 of the device A19. The impedance element B20 is connected between the terminals 116, 118.

Fig. 21 illustrates the application of the principles of the arrangement of Fig. 19 to one station of a two-way conference or distant-talking loudspeaking telephone circuit or system. In the arrangement of Fig. 21, the transducers R10, N10 are interconnected with a two-way voice frequency transmission line or loop L21 through a plurality of amplifying means or devices A21, A22 and a balanced type hybrid coil 119 and line balancing network 120. In the arrangement of Fig. 21, the device A21 is arranged to deliver amplified voice frequency currents outgoing to the line L21 through the hybrid coil 119, and the device A22 is arranged to receive voice currents from the line L21 and to deliver amplified voice currents through the transformer 102 to the transducers R10, N10 of the station. As with the arrangement of Fig. 19, choice of appropriate constants for the transducer N10 and the transformer 102 will minimize undesired feedback between the two one-way amplifying paths.

The circuit arrangement of Fig. 22 is the same as that of Fig. 21, but with impedance elements A22, B22 replacing the transformer 102, in accordance with the principles discussed hereinabove with reference to Figs. 9 to 16, inclusive.

In some cases, it may be found desirable to employ a separate pick-up device or microphone and a separate sound wave reproducer or loudspeaker, in the arrangements of Figs. 19 to 22 instead of a single device for transmitting the sound wave energy into voice currents of corresponding frequency, and vice versa. In such event, the arrangements of Figs. 19 through 22 may be readily modified as illustrated in Figs. 23 to 26, inclusive, the series-connected microphone TL and receiver or loudspeaker RL replacing the device R10, and the series-connected microphone TN and receiver or loudspeaker RN replacing the device N10; Fig. 23 otherwise corresponding to Fig. 19, Fig. 24 otherwise corresponding to Fig. 20, and Fig. 25 otherwise corresponding to Fig. 21. The arrangement of Fig. 26 corresponds to that of Fig. 22, with the additional modification of the substitution of a pair of impedance elements A26, B26 for the hybrid coil 119, in accordance with the principles developed hereinabove with reference to Figs. 9 to 16, inclusive.

Fig. 27 shows another embodiment of the invention, being illustrated in a multistation, two-way voice frequency transmission system or circuit. The system comprises subscriber stations, SUB1, SUB2; a central office or a P. B. X station 150; and transmission paths or lines 151, 151', interconnecting the subscriber stations and the central office or P. B. X circuit. Each subscriber station comprises series-connected sound wave energy pick-up device or microphone T27, T27', and sound wave energy reproducing device or loudspeaker R27, R27', positioned in a semi-enclosed chamber or housing 200, 200', shown in dotted line. The transmission paths, 151, 151', are substantially equal electrically to each other, preferably, if necessary, being built out to equality by means of an actual or aritificial loop or network 201, 201'. The position 150 may comprise repeating coils 203, 203', a so-called hybrid coil 204, and an amplifying means or device 205. In an already existing system that its to be modified in accordance with the arrangement illustrated by Fig. 27, the characteristic of the transmission path between the subscriber station and the central office could be controlled automatically by means of varistor or thermistor network at the subscriber station or in the transmission path, the characteristics of such networks being controlled by direct current (source not shown for simplicity) flowing in the system. In the arrangement of Fig. 27, the microphone and the loudspeaker at each subscriber station are shown in series, and as being in a partially enclosed acoustic chamber since acoustic coupling between the station instruments will not cause the overall system to sing even though a very high order of amplification should be employed in the system. A principal requirement for maintenance of the non-singing condition is the equality of the acoustic coupling or feedback at each of the subscriber stations, so that the impedances $Z_L$ and $Z_N$ looking out of the amplifier or repeater loop 202 do not differ appreciably at any amplified frequency.

If, in any of the embodiments of the invention referred to, the electroacoustic structures are inefficient, the amount of electrical amplification that can be used may be made much higher than it could if the structures were efficient, the assumption being that the same acoustical output may be obtained in either case, if the change in efficiency of the electroacoustical structures is similar at all frequencies, and if an unlimited amount of amplification is available.

Although this invention has been disclosed with reference to a number of specific embodiments, it will be evident to the skilled in the art that additional modifications and applications of the principles of the invention may be made without departing from the spirit or scope thereof.

What is claimed is:

1. An electroacoustic tranducer system comprising a hollow structure containing a pair of electroacoustic transducers, one of said transducers for converting sound wave energy into electric current substantially corresponding to the sound waves and the other for converting audio frequency current into sound wave energy substantially corresponding to such audio current, each of said transducers including a diaphragm, said diaphragms being spaced apart and said structure defining substantially equal-length paths to the opposite surfaces of the diaphragm of said one transducer for sound wave energy that may be generated by said other transducer, said structure including a pair of acoustic paths, one of said paths constituting a passage to the outside of said structure for sound waves originating in said other transducer and a passage to said one transducer for sound waves that may be generated outside of the structure, the second path simulating the impedance of the first path.

2. In combination, a hollow structure containing a loudspeaker and a microphone, each of said loudspeaker and said microphone including a diaphragm, said structure defining substantially equal-length paths to the opposite surfaces of the diaphragm of said microphone for sound wave energy that may be generated by the diaphragm of said loudspeaker and including a pair of acoustic paths, one of said paths constituting a passage to the outside of said structure for sound waves that may be originated in the loudspeaker and access to the microphone for sound waves that may be originated outside of the chamber, the second path simulating the acoustic impedance of the first path.

3. The combination of claim 1 in which said chamber is symmetrical in configuration.

4. An electroacoustic transducer system comprising a hollow structure defined by a plurality of interconnected tubular members, a first electroacoustic transducer for converting sound wave energy into electric currents corresponding substantially to said sound waves and a second electroacoustic transducer for converting voice frequency electric currents into sound wave energy corresponding substantially to said currents, said structure including a first acoustic path for egress from said structure of sound wave energy that may be generated by said second transducer and for ingress into said structure to said first transducer of sound waves that may be generated outside of said structure, and a second acoustic path to the outside of said structure simulating the acoustic impedance of said first path, said transducers being positioned in different ones of said tubular members, but in symmetrical relation to said acoustic paths.

5. An electroacoustic transducer system such as is claimed in claim 4 in which each of said transducers includes a sound wave translating member, the interconnected tubular members are arranged in symmetrical configuration, and an individual acoustic resistance extends across each of two of said tubular members, said acoustic resistances being located equidistant from the wave translating member of the first transducer and equidistant from the wave translating member of the second transducer.

6. An electroacoustic transducer system such as is claimed in claim 4 in which each of said transducers includes a sound wave translating member, the interconnected tubular members are arranged in symmetrical configuration, and an individual acoustic resistance extends across each of two of said tubular members, said acoustic resistances being located equidistant from the wave translating member of the first transducer and equidistant from the wave translating member of the second transducer, said tubular members being of negligible acoustic attenuation and of characteristic acoustic impedance substantially equal to that of said acoustic resistances and the sound wave translating members of the system.

7. An electroacoustic transducer system such as is claimed in claim 4 including electric current amplifying means interconnecting said transducers whereby electric currents that may be generated by said second transducer are amplified and transmitted to said first transducer to be converted into amplified sound waves by said first transducer.

KENNETH S. JOHNSON.

REFERENCES CITED

The following references are of record in the file of this patent:

UNITED STATES PATENTS

| Number | Name | Date |
|---|---|---|
| 2,177,769 | Erickson | Oct. 31, 1939 |
| 2,208,160 | McCreary | July 16, 1940 |
| 2,227,580 | Harry et al. | Jan. 7, 1941 |
| 2,301,744 | Olson | Nov. 10, 1942 |
| 2,348,629 | Johnson | May 9, 1944 |
| 2,431,962 | Rettinger | Dec. 2, 1947 |
| 2,485,405 | Olney | Oct. 18, 1949 |